(12) United States Patent
Mookanahallipatna Ramasesha et al.

(10) Patent No.: US 11,119,248 B2
(45) Date of Patent: Sep. 14, 2021

(54) METHOD FOR ESTIMATING THE FRACTURED VOLUME IN A RESERVOIR DOMAIN BY INJECTING A HIGH PRESSURE FLUID

(71) Applicants: Repsol, S.A., Madrid (ES); UNIVERSIDAD POLITÉCNICA DE CATALUÑA, Barcelona (ES)

(72) Inventors: Lakshmikantha Mookanahallipatna Ramasesha, Madrid (ES); José Alvarellos Iglesias, Madrid (ES); José María Segura Serra, Madrid (ES); Ignacio Carol Vilarasau, Barcelona (ES); Daniel Garolera Vinent, Barcelona (ES); Pere Prat Catalan, Barcelona (ES)

(73) Assignees: REPSOL, S.A., Madrid (ES); UNIVERSIDAD POLITÉCNICA DE CATALUÑA, Barcelona (ES)

(*) Notice: Subject to any disclaimer, the term of this patent is extended or adjusted under 35 U.S.C. 154(b) by 0 days.

(21) Appl. No.: 16/633,414

(22) PCT Filed: Aug. 20, 2018

(86) PCT No.: PCT/EP2018/072382
§ 371 (c)(1),
(2) Date: Jan. 23, 2020

(87) PCT Pub. No.: WO2019/038212
PCT Pub. Date: Feb. 28, 2019

(65) Prior Publication Data
US 2020/0386907 A1  Dec. 10, 2020

(30) Foreign Application Priority Data
Aug. 21, 2017 (EP) .................... 17382578

(51) Int. Cl.
*G01V 99/00* (2009.01)
*G06F 30/23* (2020.01)
(Continued)

(52) U.S. Cl.
CPC .......... *G01V 99/005* (2013.01); *E21B 47/003* (2020.05); *G06F 30/23* (2020.01);
(Continued)

(58) Field of Classification Search
CPC ..... G01V 99/005; G06F 30/23; E21B 47/003; E21B 43/26
See application file for complete search history.

(56) References Cited

U.S. PATENT DOCUMENTS 10,529,131 B2 * 1/2020 Brewer .................. G06T 17/05
2013/0204588 A1  8/2013 Copeland
(Continued)

FOREIGN PATENT DOCUMENTS

WO  WO-2015124633 A1 * 8/2015 ............. G06F 17/13
WO  2017082909 A1  5/2017

OTHER PUBLICATIONS

Extended European Search Report for EP Application No. 17382578.7 dated Feb. 21, 2018 (7 pages).
(Continued)

*Primary Examiner* — Crystal J Miller
(74) *Attorney, Agent, or Firm* — Reising Ethington P.C.

(57) ABSTRACT

The present invention is related to a method for estimating the fractured volume in a reservoir domain, said fractured volume generated by injecting a high pressure fluid into the reservoir domain. The high pressure fluid generates new fractures allowing a more effective drainage of porous rocks, generally identified as geological material, containing oil or gas. As a result, the effective reservoir volume increases. According to embodiments of the invention, the method (Continued)

provides a dynamic estimation of the fractured volume taking into account the evolution of the rock and the fractures. In other embodiment, the evolution of the fractured volume is estimated by generating an envelope surrounding the induced fractures allowing a better estimation of the fractured volume.

14 Claims, 9 Drawing Sheets (51) Int. Cl.
      *E21B 47/003*     (2012.01)
      *G06F 113/08*     (2020.01)
      *G06F 111/10*     (2020.01)
      *E21B 43/26*     (2006.01)

(52) U.S. Cl.
      CPC ........... *E21B 43/26* (2013.01); *E21B 2200/20* (2020.05); *G06F 2111/10* (2020.01); *G06F 2113/08* (2020.01)

(56) References Cited

U.S. PATENT DOCUMENTS

2014/0136158 A1* 5/2014 Hegazy .................. G06T 17/05
                                                  703/2
2015/0377005 A1* 12/2015 Garcia-Teijeiro ..........................
                                                    E21B 47/0224
                                                    703/10
2017/0059742 A1 3/2017 Mookanahallipatna Ramasesha et al.

OTHER PUBLICATIONS

S. Charoenwongsa et al: "A Fully-Coupled Geomechanics and Flow Model for Hydraulic Fracturing and Reservoir Engineering Applications", Canadian Society for Unconventional Gas, vol. CSUG/SPE 137497, Oct. 19, 2010, XP055072328, Canadian Unconventional Resources & International Petroleum Conference. 19-21 (31 pages).

Josef Shaoul et al.: "Developing a Tool 1 for 3D Reservoir Simulation of Hydraulically Fractured Wells", SPE Reservoir Evaluation & Engineering, vol. 10, No. 1; Feb. 1, 2007, XP055072313 (10 pages).

Elyezer Lolon et al: "Application of 3-D Reservoir Simulator for Hydraulically Fractured Wells", Proceedings of Asia Pacific Oil and Gas Conference and Exhibition; Jan. 1, 2007, XP055072303 (8 pages).

* cited by examiner

METHOD FOR ESTIMATING THE FRACTURED VOLUME IN A RESERVOIR DOMAIN BY INJECTING A HIGH PRESSURE FLUID

RELATED APPLICATION

This application is the National Stage of International Patent Application No. PCT/EP2018/072382, filed on Aug. 20, 2018.

FIELD OF THE INVENTION

The present invention is related to a method for estimating the fractured volume in a reservoir domain, said fractured volume generated by injecting a high pressure fluid into the reservoir domain. The high pressure fluid generates new fractures allowing a more effective drainage of porous rocks, generally identified as geological material, containing oil or gas. As a result, the effective reservoir volume increases.

According to embodiments of the invention, the method provides a dynamic estimation of the fractured volume taking into account the evolution of the rock and the fractures.

In other embodiment, the evolution of the fractured volume is estimated by generating an envelope surrounding the induced fractures allowing a better estimation of the fractured volume. Along the description, induced fracture or stimulated fracture are deemed to be equivalent.

PRIOR ART

Oil and gas reservoirs are domains located in geological structures wherein the geological materials of said structures are porous media containing the oil, gas or both. Hereinafter, fluids such as oil, gas or a combination of both will be identified as hydrocarbons. The geological structures may be comprised by continuous media and they may also have natural fractures.

Even if the porous media contain fluids such as oil and/or gas, the fluids may not be efficiently retrieved because the pores of the porous medium are not interconnected showing a very low or even negligeable permeability preventing the flow of the fluid from the rock to a production pipe.

Even if pores of the porous media are inter-connected, permeability of the rock may be very low and the drainage provides low flows from the rock to the production pipes requiring long periods of time for retrieving the stored fluid or providing conditions of flow not allowing profitable facilities. As fractures are channels providing flows having several orders of magnitude higher than the diffusion flow through a porous media, a common technique for retrieving a higher amount of fluid is fracturing the porous media.

According to the prior art, the method for generating induced fractures comprises a first step wherein one or more boreholes are perforated in the reservoir. An injection pipe is housed in the borehole providing points of injection of a high pressure fluid. The injection of a high pressure fluid increases the pressure of the rock over the strength of the rock causing fractures departing from the injection location or the reopening of natural fractures intersected by the induced fracture. During flow back or production, induced fractures release the fluid trapped in the porous media and allows the flow of the fluid from the rock to the location of the injection point.

Once the injection of the fluid at a high pressure has generated induced fractures, a plurality of channels is available for recovering the fluid. In this case, the injection pipe is used as a production pipe and the released fluid flows from the rock to the former injection point, now the production point, feeding the production pipe.

The fractured volume is the volume of the fractures allowing the recovering of the fluid stored in the fractured rock or in the geological material.

It is known the publication "Why fracking works", Journal of Applied Mechanics, Zdenek P. Baiant et al., October 2014, Vol 81, disclosing fracking volumes being analyzed analytically. In this paper, to make analytical estimates possible, it is considered the fracked zone to be an elliptical cylinder with a vertical axis, height h, and a generating horizontal ellipse of axes a and b. The analysis over a single fracture or crack allows the estimation of the cracked volume (using the wording of the paper) in particular in shale and shrunken zones.

In the same paper, numerical results have been obtained for determining the fractured volume proposing vertical circular fractures of equal spacing S and radius R.

As a result, in the prior art fractured volume is estimated by proposing a simple volume in the form of a lentil surrounding the injection point being said volume in the form of a lentil perpendicular to the central axis of the borehole. This volume may be shifted from said central axis.

One individual volume in the form of a lentil is located at each injection point and the total fractured volume is the summation of the volumes located along the borehole or the boreholes.

The form of a lentil is proposed because the first fractures are located near the injection point and uses analytical results. This hypothesis can be applied to shale zones deemed as isotropic, knowing that the anisotropy of shale would have to be taken into account for more realistic predictions. In this case, the response is assumed to be symmetric with respect to each fracture plane, which is again an idealized situation obtained for a fracture system infinite in the direction normal to the fractures. With these assumptions it is possible to exploit symmetry with respect to the fractures plane and analyze only a slice of the cylinder between two fracture planes.

Regarding the fracturing mechanism, once an induced fracture appears, the high pressure fluid propagates along the fracture increasing the pressure at points located along the first fracture that may also generate a new second fracture departing from certain point of the first fracture. This mechanism may be reproduced for new generations of fractures wherein the main fractures are mainly the first one as the pressure decay from the injection point until the end of the last fracture. Main fractures are then located around the injection point and the volume is deemed to be reduced at points located far from the injection point.

This estimation of the fractured volume has several drawbacks. The main drawback is that the geological structure and properties of the rock has no influence on the volume estimation.

Other parameters such as those related to the in-situ state of stress of the reservoir, or changes caused by the production process reducing the geometry of fractures, are not taken into account.

Other parameters such as the influence of fractures on the state of stress when using a single injection point over subsequent fractures generated in other injection points are not taken into account as all individual volumes in the form of lentils are the same.

The influence and the interference of natural fractures and faults on the propagation of induced fractures has to be taken into account, which depends on the distribution and orientation of the natural fractures, faults and in-situ stress.

Present invention provides a new computer implemented method for estimating the fracture volume in a reservoir domain by injecting a high pressure fluid, which is more reliable because the geological structures and other additional parameters are taken into account.

DESCRIPTION OF THE INVENTION

The present invention relates to a computer implemented invention, in particular a method for estimating the fractured volume in a reservoir domain wherein induced fractures are generated by injecting a high pressure fluid.

The domain comprises at least one borehole with at least one injection point for generating fractures in the domain by injecting the high pressure fluid.

The method is a computer implemented method and it comprises:
a) generating, via a computer system, a geomechanical model of the reservoir domain employing information from said reservoir;
b) generating, via a computer system, a fluid flow model for the fluid stored in the reservoir and for the injection fluid;
c) generating, via a computer system, a first numerical mesh discretizing the geomechanical model, said discretization allowing to represent induced fractures in said domain;
d) generating, via a computer system, a second numerical mesh discretizing the fluid model;
e) populating, via a computer system, the first numerical mesh with mechanical properties and the second numerical mesh with fluid properties.

The geomechanical model of the reservoir domain allows the simulation of the behavior of the geological structures and rocks located in the domain. This model is being discretized providing a numerical model that may be run in a computer system.

The fluid flow model allows the simulation of the behavior of the fluid being stored in the geological structures and rocks located in the domain and, it also allows the simulation of the flow of the fluid along the natural fractures and induced fractures. Natural fractures are those fractures existing before injecting the high pressure fluid and induced fractures are those fractures generated by injecting said high pressure fluid. This model is being discretized providing a numerical model that may be run in a computer system.

Each numerical model, the discretized geomechanical model and the discretized fluid flow model may have different meshes or, the two discretizations may share the node locations of the two meshes.

When the first numerical mesh is populated with mechanical properties, porosity and permeability are two relevant properties. Other properties related to the elasticity of the material allow to simulate the evolution of the permeability, the opening of fractures during the injection of the high pressure fluid and the closing of the fractures for instance when the stored fluid is being drained reducing the fluid pressure within fractures and pores.

According to an embodiment of the invention, a finite element method is used as the discretization method.

The next steps according to the invention comprise:
f) estimating the initial stress in the geomechanical model and defining the initial conditions for the geomechanical model with said stresses, and the initial conditions for the fluid flow model, via a computer system;
g) simulating, via a computer system, for a predetermined period of time the geomechanical model and the fluid model, both models being coupled wherein the boundary conditions take into account the injection of high pressure fluid conditions by means of the at least one injection point.

In a preferred embodiment, the geomechanical model and the fluid flow model allow the simulation in time of the reservoir; therefore, the discretized numerical models are defined as an initial value problem requiring an initial value plus boundary conditions. The initial stress of the geological material is therefore estimated. In this estimation, an estimation of the in-situ state of stress must be generated. This is at least one reason by which the initial stress is also an estimation.

The fluid flow model also requires the initial conditions plus boundary conditions. These boundary conditions comprise the injection flow of the high pressure fluid for generating the induced fractures during the process of generating induced fractures.

In a later stage, according to another embodiment, the numerical model also comprises the boundary conditions allowing the drainage of the fluid during the production process.

According to the invention, the two numerical models are coupled. That is, variations of the pressure in the fluid model generate external forces acting over the geomechanical model modifying the state of stress of the geological materials and therefore having influence on the deformation of said materials; in particular, in the aperture of the fractures.

Changes in the deformations of the geological material and mainly in the aperture of the fractures, provides important changes in the fluid flow. The geomechanical model is also being coupled with the fluid flow because the deformed geological material and the channels defined by said deformed geological material has a very important influence on the flow.

The last steps according to the invention comprise:
h) determining, via a computer system, the numerical mesh regions where the stimulated fracture exist;
i) computing, via a computer system, the fractured volume measuring the volume of said numerical mesh regions where the stimulated fracture exist.

Induced fractures generated by means of the injection of the high pressure fluid are represented by the numerical mesh. The volume in the numerical mesh corresponding to regions where the stimulated fractures exist is numerically measured and it provides a good estimation of the fractured volume.

Other embodiments providing improved estimations of the fractured volume will be disclosed below when disclosed the detailed description of the invention.

DESCRIPTION OF THE DRAWINGS

These and other features and advantages of the invention will be seen more clearly from the following detailed description of a preferred embodiment provided only by way of illustrative and non-limiting example in reference to the attached drawings.

DETAILED DESCRIPTION OF THE INVENTION

As will be appreciated by one skilled person in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" or FORTRAN programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to illustrations and/or diagrams of methods, apparatus (systems) and computer program products according to embodiments of the invention. It will be understood that each illustration can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
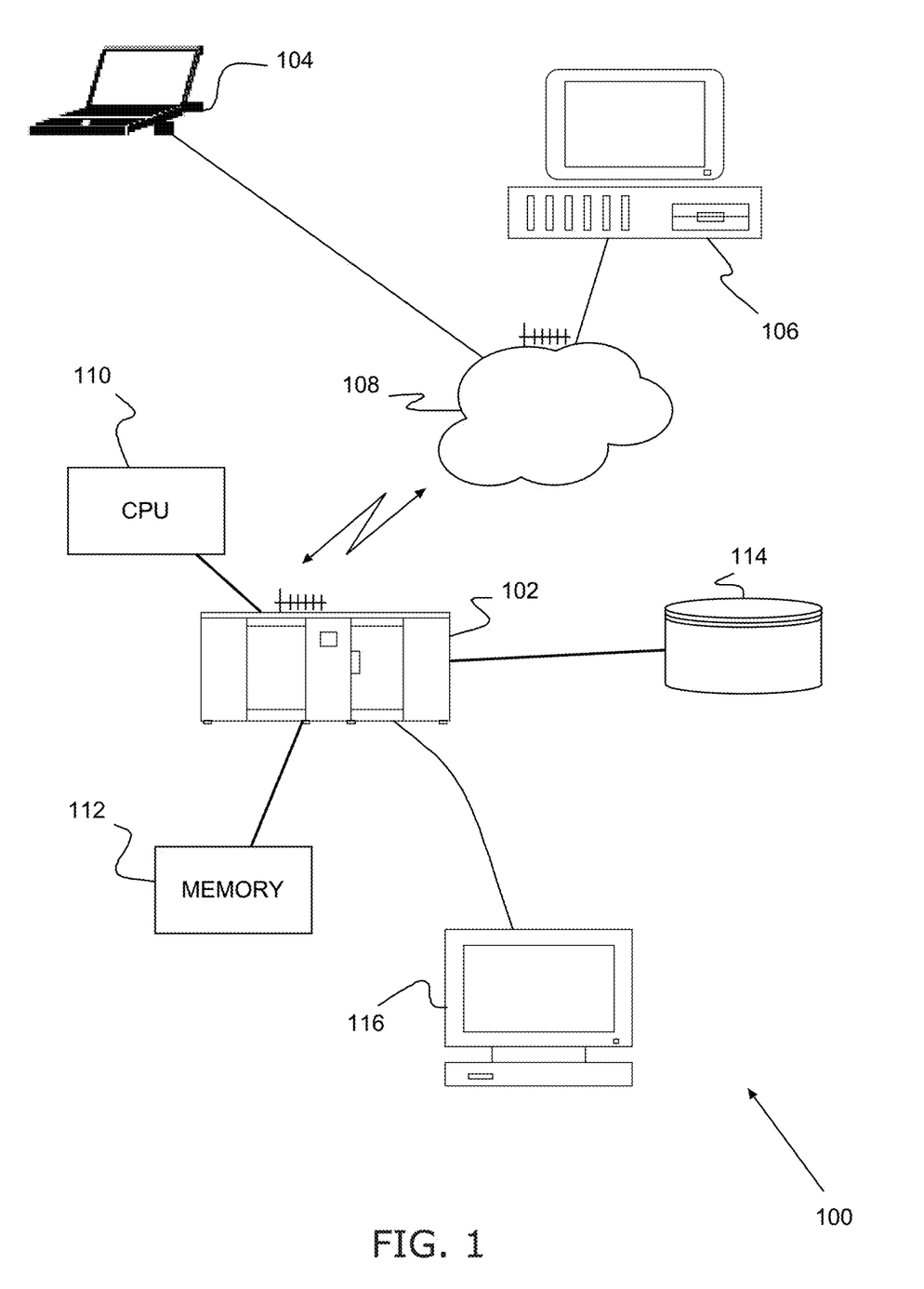
FIG. 1 This figure shows a data processing system for carrying out a method according to the invention.

Turning now to the drawings and more particularly, FIG. 1 shows an example of a system 100 for estimating the fractured volume in a reservoir delimited by a determined domain, comprising at least a borehole with at least one injection point for generating induced fractures in said domain, according to a preferred embodiment of the present invention.

The preferred system 100 in adapted to carry out steps a)-i) combining two models, a geomechanical model and a fluid flow model, in a coupled manner allowing the simulation of the generation of induced fractures when the high pressure fluid is injected into the domain through the at least one injection point and computing the subsequent estimation of the fractured volume.

A preferred computing system 100 includes one or more computers 102, 104, 106 (3 in this example), coupled together, e.g., wired or wirelessly over a network 108. The network 108 may be, for example, a local area network (LAN), the Internet, an intranet or a combination thereof. Typically, the computers 102, 104, 106 include one or more processors, e.g., central processing unit (CPU) 110, memory 112, local storage 114 and some form of input/output device 116 providing a user interface. The local storage 114 may generate and/or include the information for generating the geomechanical model and for generating the fluid flow model being accessible by the plurality of computers 102, 104, 106, processing in parallel the time integration required for the simulation of the two models when evolving during the generation of induced fractures and the subsequent post processing calculating the fractured volume.

Figure 2:
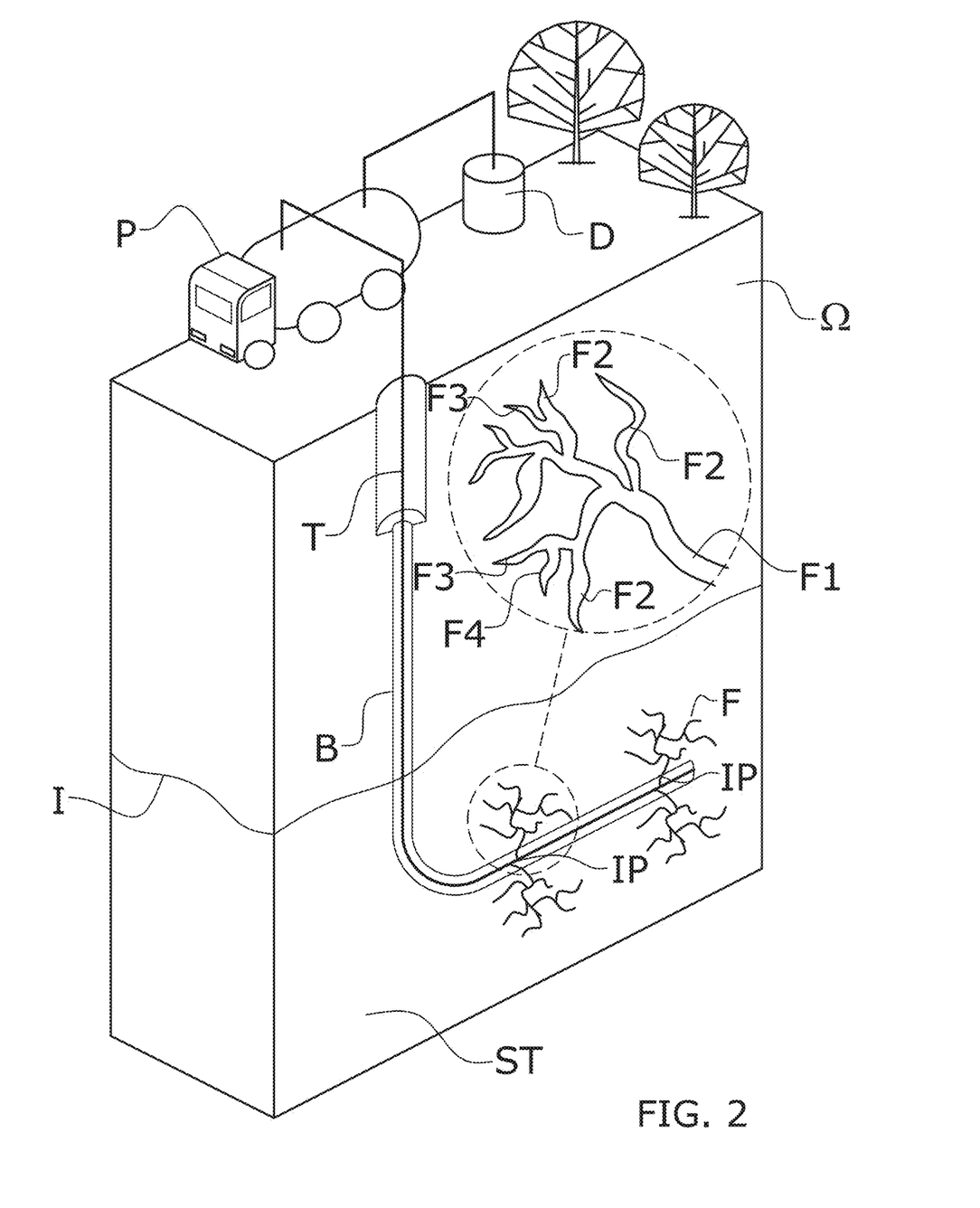
FIG. 2 This figure shows a schematic sectional view of a high pressure fluid flow injection system in operative manner generating fractures in a reservoir.

FIG. 2 shows a schematic sectional view of the reservoir domain ($\Omega$) having a high pressure fluid flow injection system, in operative manner, for generating fractures (F) in a reservoir.

The reservoir domain ($\Omega$) comprises an inner region (ST), shown at the bottom of the domain ($\Omega$), of a porous medium storing the hydrocarbon resources to be exploited. According to this embodiment, the reservoir domain ($\Omega$) used during the simulations comprises the whole set of stratigraphic layers located from the inner region (ST) until the upper surface. According to other embodiments, the reservoir domain ($\Omega$) may be limited to the inner region (ST) and some surrounding regions if the influence of the surrounding geological material in the state of stress in the domain ($\Omega$) and the fluid flow can be determined when imposing the boundary conditions.

The injection system comprises a water tank (D) containing water, the fluid used as the high pressure fluid in this specific embodiment for generating the induced fractures (F). According to other embodiments, the high pressure fluid may be a mix of water and sand allowing to keep the induced fractures open.

According to an embodiment, a high pressure pump (P), represented by a truck located on the surface over the reservoir domain ($\Omega$) and having said high pressure pump, is fed by the water tank (D) and injects the water at high pressure through a steel tubing (T) housed a the borehole (B).

The borehole (B) and the steel tubing (T) housed in said borehole (B) show a first vertical section and a second horizontal section. The second horizontal section is the section parallel to the inner region (ST) storing the hydrocarbon resources and the section wherein the steel tubing (T) has the injection points (IP) for generating the induced fractures (F).

The plurality of injection points (IP) of the steel tubing (T) may be opened or closed by means of a control system not represented in this figure.

According to an embodiment, the process for generating induced fractures starts opening the injection point (IP) closest to the end of the steel tubing (T). Once the induced fractures are generated, the control system closes this injection point (IP) closest to the end and opens the next adjacent injection point (IP). This process is sequentially applied until the total number of injection points (IP) has been used.

Figure 3:
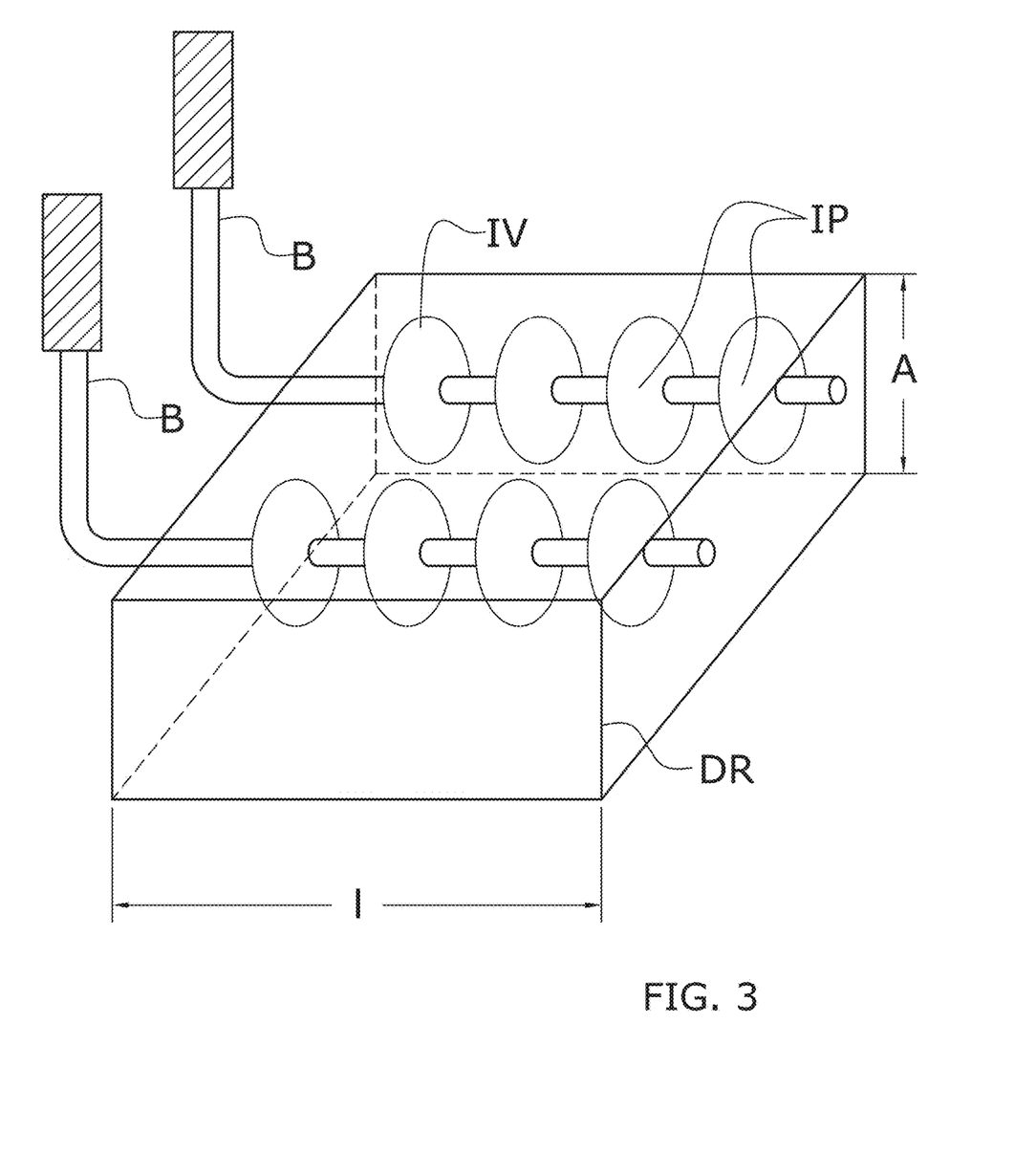
FIG. 3 This figure shows a schematic view of a domain according to the prior art wherein the estimated fractured volume is calculated by generating individual volumes in the form of lentils.

FIG. 3 shows an schematic representation of the inner region (ST) storing the hydrocarbon resources and individual volumes (IV), in the form of lentils, located at each injection point (IP) according to the prior art. Individual volumes (IV) represent the region being affected by fractures (F). In this schematic representation all individual volumes (IV) have the same shape and volume.

Parameter 1 shows the total length of the induced region, shown as a rectangular prism, comprising individual volumes (IV) and, A is the formation height of said region.

Figure 4:
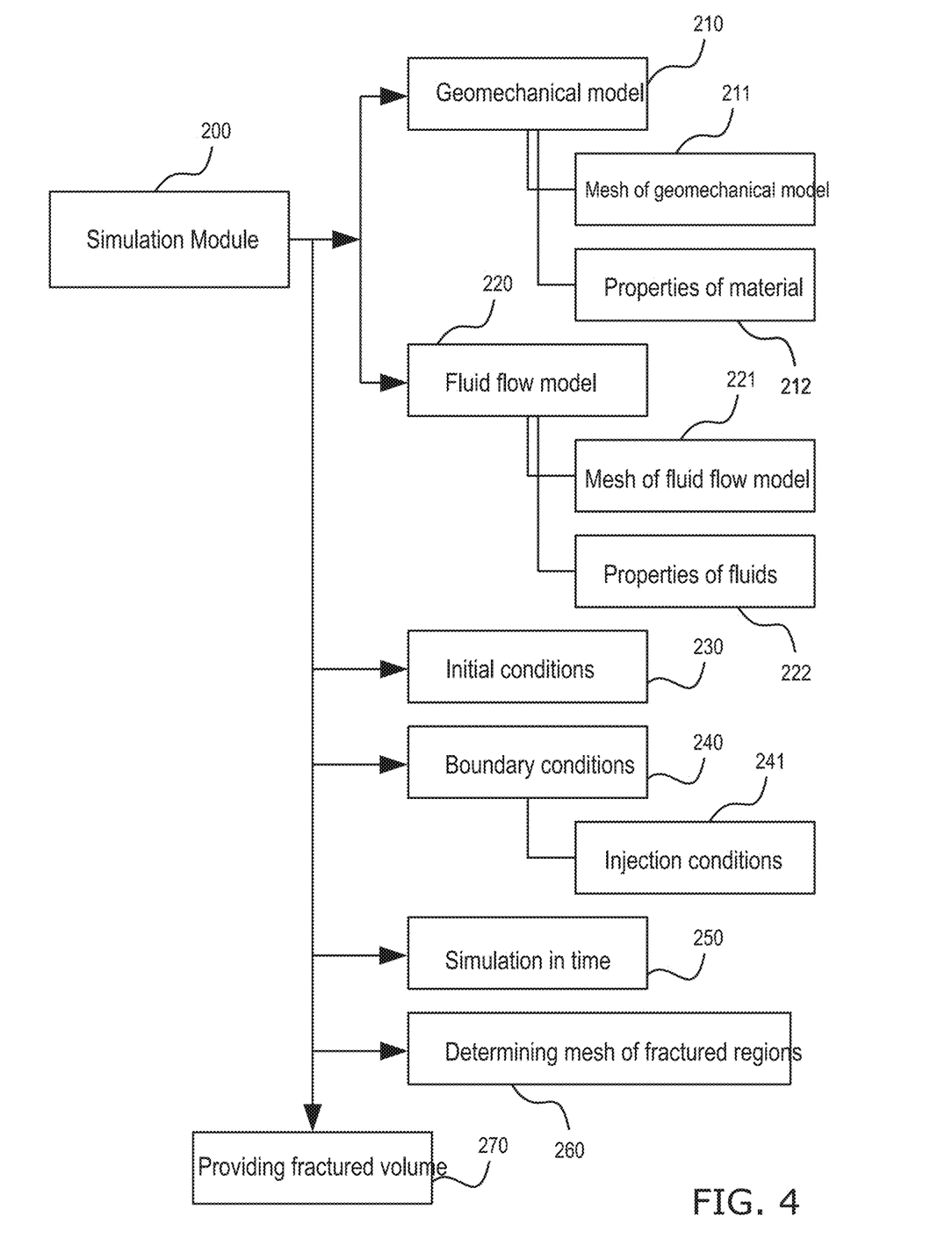
FIG. 4 This figure shows the workflow of the algorithm according to the preferred embodiment for estimating the fractured volume.

FIG. 4 shows a schematic representation of the method according to a preferred embodiment of the invention.

A simulation module (200) generates a geomechanical model (210) representing the geological structures of the reservoir domain ($\Omega$). The geomechanical model (210) is a numerical model obtained by discretizing the domain ($\Omega$) taking into account the geological stratigraphic layers, discontinuities, natural fractures or the shape of the at least one borehole (B) among other parameters. The discretization process of the geomechanical model (210) requires a mesh generation (211) that may be post processed for instance by adaptive meshes taking into account the geological structures represented by the geomechanical model.

The simulation module (200) according to the same preferred embodiment generates a fluid flow model (220) representing the fluid stored at least in the inner region (ST), any fluid stored in porous media, the fluid stored in cavities or fractures (F) and also the flow of the injected fluid. The fluid flow model (220) may comprise separated equations for the flow in porous media, for instance Darcy's equations, and the flow within fractures or cavities, for instance the Navier-Stokes equations. The stored fluid may comprise two or more phases that may be taken into account in the fluid flow model (220).

The discretization process of the fluid flow model (220) requires a mesh generation (221) that may be post processed for instance by adaptive meshes taking into account the sharpness of natural fractures or the flow conditions such as boundary layers.

The geomechanical model (210) and the fluid flow model (220) are populated (212, 222) with the geomechanical material properties and the fluid properties respectively.

The geomechanical model (210) and the fluid flow model (220) are numerical models allowing the simulation of the reservoir in several conditions. The main condition corresponds to the injection process for generating induced fractures (F1, F2, F3, F4) for releasing the trapped hydrocarbon in the porous media. This process evolves in time as the injection of the high pressure fluid is carried out in a sequential manner and the propagation of the injected high pressure fluid also evolves in time.

In a first step, the high pressure fluid is injected through the injection point (IP) located at the end of the steel tubing (T). Fractures (F) start in the vicinity on the injection point (IP) as said vicinity reaches the highest pressure increasing the probability of surpassing the maximum stress of the geological material. As it is shown in FIG. 2, the induced fracture (F1) propagates the high pressure of the high pressure fluid being injected along the path of the new generated fracture (F1) allowing the generation of additional fractures (F2) departing from this first fracture (F1). This pressure propagation and generation of new fractures (F) may generate a third generation of fractures (F3) departing from the second generation of fractures (F2), a fourth generation of fractures (F4) departing from fractures of the third generation of fractures (F3) and so on. This process is also schematically depicted in FIG. 8A as first, second, third order fractures, wherein the first generation/order of fractures are connected to the second generation/order of fractures by the identified connection 1-2. The same applies to the second and third generation/order of fractures being connected by connection 2-3.

Figure 8A:
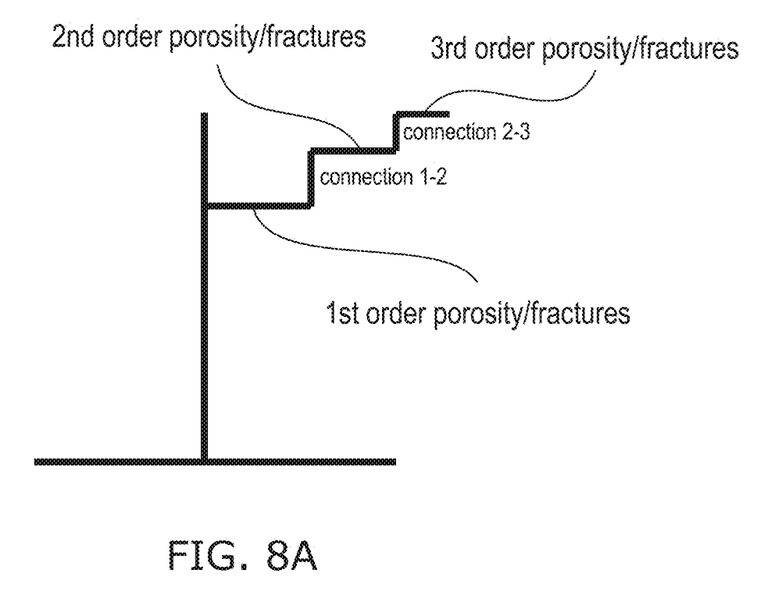
FIG. 8A This figure shows an schematic representation of first, second and third order fractures for the analysis of the estimated fractured volume.
Figure 8B:
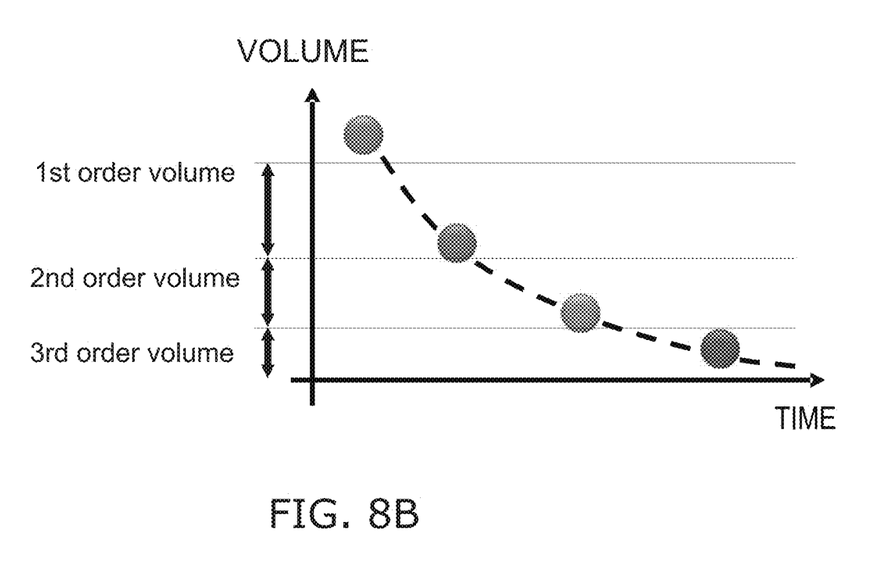
FIG. 8B This figure shows the evolution of the produced volume from a borehole being comprising a stimulated volume having first, second and third order fractures as being represented in former FIG. 8A.

FIG. 8B shows the production process wherein the hydrocarbon resources trapped in the porous media and released by inducing fractures (F). The hydrocarbon located within the first order of fractures, the identified first order volume, is the first fluid flowing to the production tube. The resistance to the flow is low and the volume obtained in the beginning is high. The next volume is obtained from the second order volume wherein the resistance to the flow is higher and therefore the flow flowing to the production tube is lower. The graphical representation shows the exponentially decaying volume retrieved throughout the production pipe depending on the order volume being drained.

When the geological material is fractured, the status of the tensional stress is being modified in the rest of the domain ($\Omega$). Therefore, when the injection of the high pressure fluid starts in a new injection point, the stress conditions of the domain ($\Omega$) have been modified causing a different shape of the new induced fractures (F). This effect will be discussed below.

According to the preferred embodiment, injection conditions (241) are implemented when simulating the evolution of the geomechanical model (210) and the fluid flow model (220) as external conditions when initial conditions (230) and boundary conditions (240) are imposed for the simulation in time of the reservoir.

The simulation module (200) is being executed in a computer system simulating in time (250) the generation of induced fractures caused by the injection of the high pressure fluid. Once the simulation has simulated the generation of the new fractures (F), those numerical mesh regions representing induced fractures (F1, F2, F3, F4) are identified (260). For instance, if a finite element method is used for discretizing the fluid flow model in an induced fracture (F), according to an embodiment, the numerical mesh regions where the stimulated fracture exist are identified by the finite elements representing the fracture (F).

Once the induced or stimulated fractures (F) are identified, the fractured volume is computed measuring the volume of said numerical mesh regions where the stimulated fracture exists.

The information regarding the location and shape properties of natural fractures may be available only by means of statistical distributions. According to another embodiment, the geomechanical model (210) and the fluid flow model (220) comprise preexisting fractures statistically distributed according to reservoir information. For instance, a random generator may distribute natural fractures within the domain ($\Omega$) taking into account width, length and orientation probability density functions.

According to another embodiment, steps f) to i) of the invention, that is:

f) estimating the initial stress in the geomechanical model and defining the initial conditions for the geomechanical model with said stresses, and the initial conditions for the fluid flow model, via a computer system;

g) simulating, via a computer system, for a predetermined period of time the geomechanical model and the fluid model, both models being coupled wherein the boundary conditions take into account the injection of high pressure fluid conditions by means of the at least one injection point;

h) determining, via a computer system, the numerical mesh regions where the stimulated fracture exist;

i) computing, via a computer system, the fractured volume measuring the volume of said numerical mesh regions where the stimulated fracture exist, are iteratively executed causing the generation of two or more generations of induced fractures (F2, F3, F4, . . . ) wherein said iterations take into account the stress field in the domain ($\Omega$) being modified by the former generated fractures.

If a finite element method is used for the discretization of the geomechanical model (201) and the fluid flow model (220), zero-thickness elements are preferably used for representing those regions of the domain ($\Omega$) where fractures appear or where natural fractures exist.

According to this embodiment, the simulation module generates a plurality of orders of fractured volume as represented in FIGS. 8A and 8B.

Figure 9A:
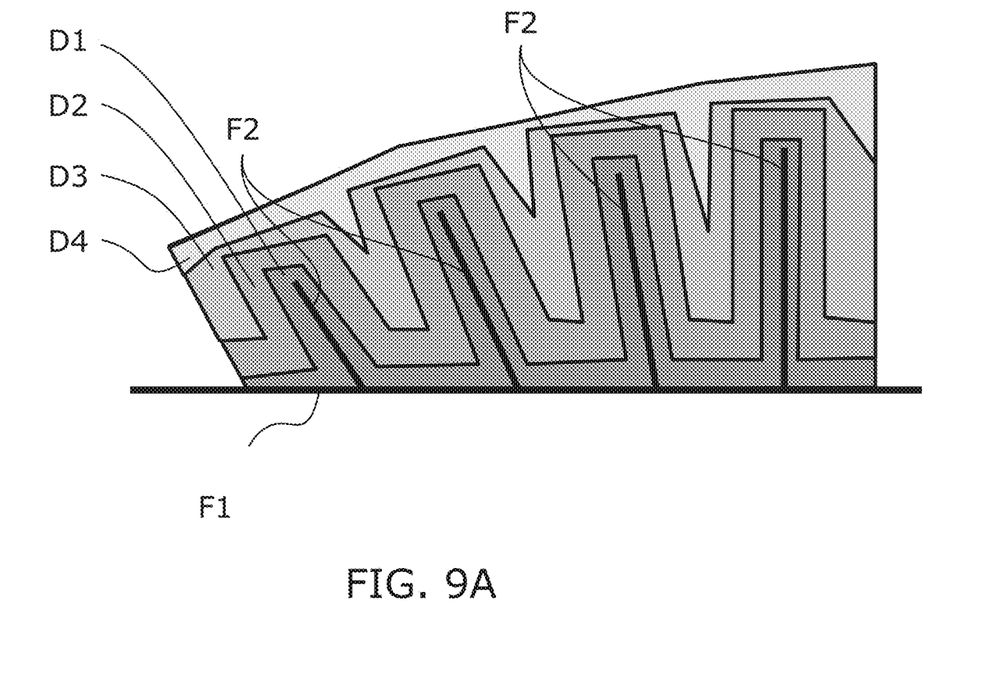
FIG. 9A This figure shows an schematic representation of a plurality of volumes being obtained by generating fractures in a certain region and providing a sequence of volumes according to the computation of drainage at several stages.

Once fractures (F) have been generated according to any of the previous embodiments, a drainage process is simulated imposing boundary conditions over the fluid flow model (220) such that drainage is located in the injection points (IP). Drainage process is more important in the vicinity of fractures (F) wherein a drainage front is identified. As it is shown in FIG. 9A, drainage front is configured as an envelope surrounding the whole set of fractures (F). The envelope is a reliable estimation of the stimulated reservoir volume when porous of porous media allows the migration of hydrocarbon stored in porous media to fractures. The envelope takes into account the volume of fractures plus the surrounding volume of hydrocarbon fluids that are migrated to fractures (F) and then drained to the production tube. This process may be executed in the computer system according to the following steps:

during the simulation of step g), for a predetermined period of time the boundary conditions of the simulation states that the reservoir is drained though the injection points; and wherein the method further comprises, automatically computing, via a computer system, the envelope (E) of each fracture (F) as the draining front surrounding said fracture (F); and, automatically computing, via a computer system, the stimulated reservoir volume as the volume of the numerical mesh regions where the stimulated facture (F) exist and the adjacent numerical mesh regions bounded by the envelope (E).

According to any of previous embodiments, the drainage defining the boundary conditions (240) is carried out in a sequential manner along the sections of the borehole (B) using the inverse order of the sequence followed during the injection.

Figure 9B:
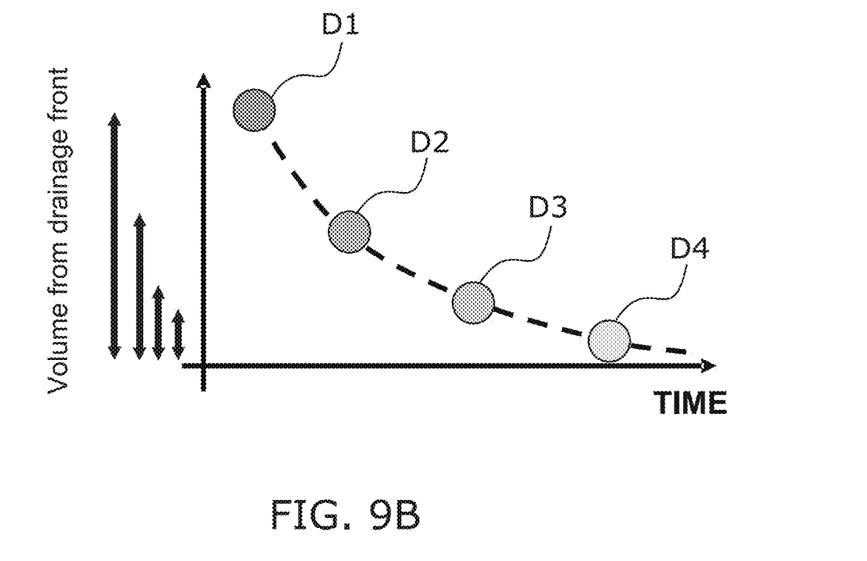
FIG. 9B This figure shows the production volume in time according to the estimated volume shown in FIG. 9A.

FIG. 9B shows the volume being drained in time for several envelops (D1-D4). In the very beginning the first envelop represents the fluid being closest to fractures and therefore the flow is higher. The fluid being stored in more distant regions require additional time migration for reaching any of induced fractures reducing the flow rate. This effect is represented by the decaying function from D1 to D4.

According to any of previous embodiments, during the simulation (250), the flow injection through the injection points (IP) also provides injecting a proppant for keeping the fractures open. This proppant is a material previously mixed with the high pressure fluid that, once it has been injected fills the fractures (F), in particular the new generated fractures (F) keeping the fractures open.

According to any of previous embodiments, the simulation (250) of the drainage comprises re-meshing and, the computation of the volumes, the computation of the extended volumes or both, are carried out over the deformed mesh (211, 221).

Figure 5:
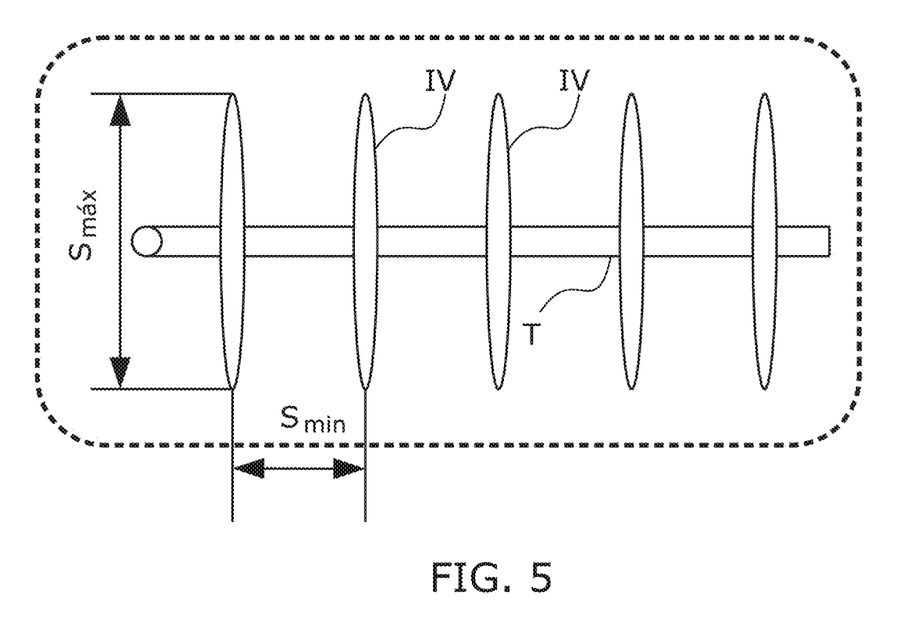
FIG. 5 This figure shows a schematic sectional view of the steel-lined well with injection points and the individual volumes having a lentil form.

FIG. 5 shows an schematic representation of individual volumes (IV) associated to a plurality of injection points (IP) equally distributed along the steel tube (T). The distance between two consecutive injection points is identified as $S_{min}$ and the characteristic diameter of the fractured volume is identified as $S_{max}$.

Figure 6A:
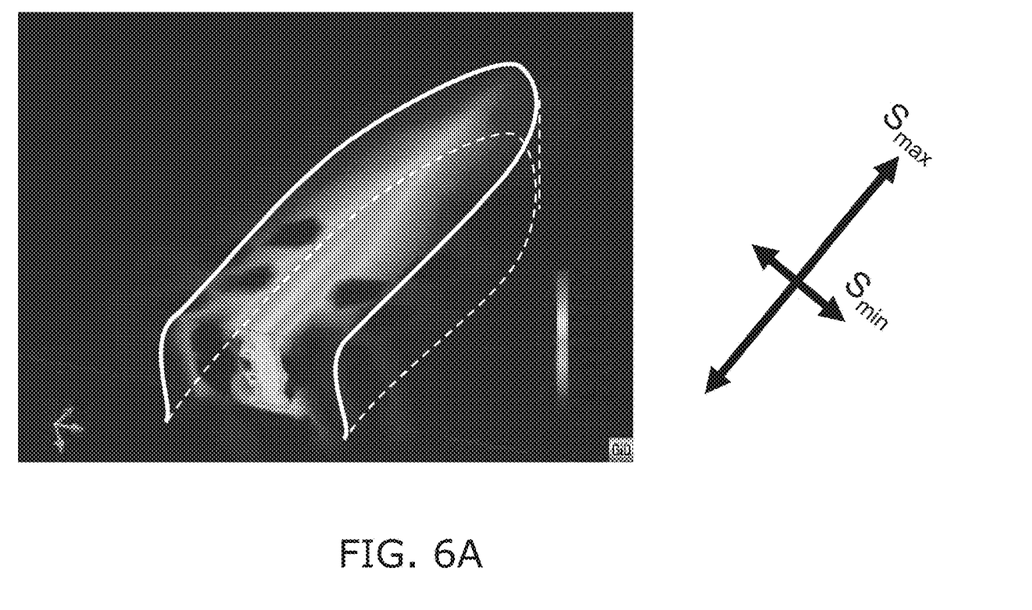
FIGS. 6A, 6B These figures show a simulation of a single induced fracture corresponding to a fracture being influenced by a distorted stress field caused by other fractures, respectively.

FIG. 6A shows a portion of the domain ($\Omega$) showing an induced fracture because the injection of the high pressure fluid. The induced fracture has evolved in a perpendicular direction to the base of the fracture located in the root of said fracture. This evolution is obtained when media and the stress is homogeneous.

Figure 6B:
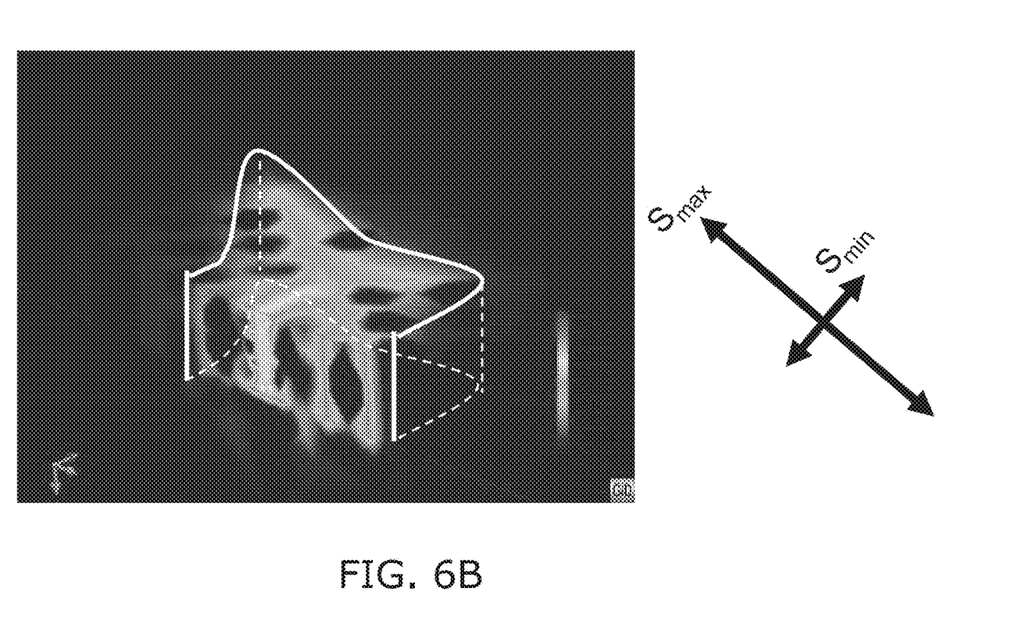

As the individual volumes (IV) are generated sequentially, after the generation of the first individual volume (IV) the stress status of the domain ($\Omega$) is modified and new fractures (F) do not propagate in a direction perpendicular to the borehole but they propagate in an oblique direction following the direction of the maximum stress, modified due to the previous fracturing stage, trying to separate from the already generated individual volumes (IV). FIG. 6B shows the oblique propagation of an induced fracture under the second identified conditions.

Figure 7A:
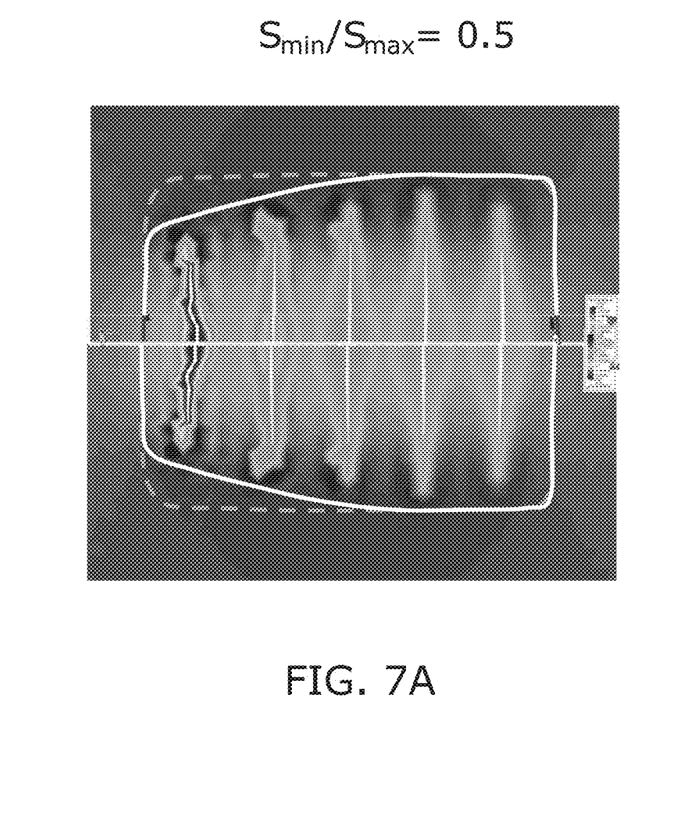
FIGS. 7A, 7B These figures show a simulation of the set of the volumes comprising induced fractures along the steel tube comprising a plurality of injection points with almost no influence of the first induced volumes and with a high influence on the stress in the rock of the first induced volumes respectively.

FIG. 7A shows a simulation wherein the influence of the already generated individual volumes (IV) is very low having an initial horizontal stress ratio $S_{min}/S_{max}$ of 0.5. In this case, the individual volume (IV) is slightly reduced in the left side (according to the orientation of the figure) where the injection is carried out in the last stages of the injection process. Only in this regions located at the left shows a reduction of the maximum diameter of the individual volumes (IV).

Figure 7B:
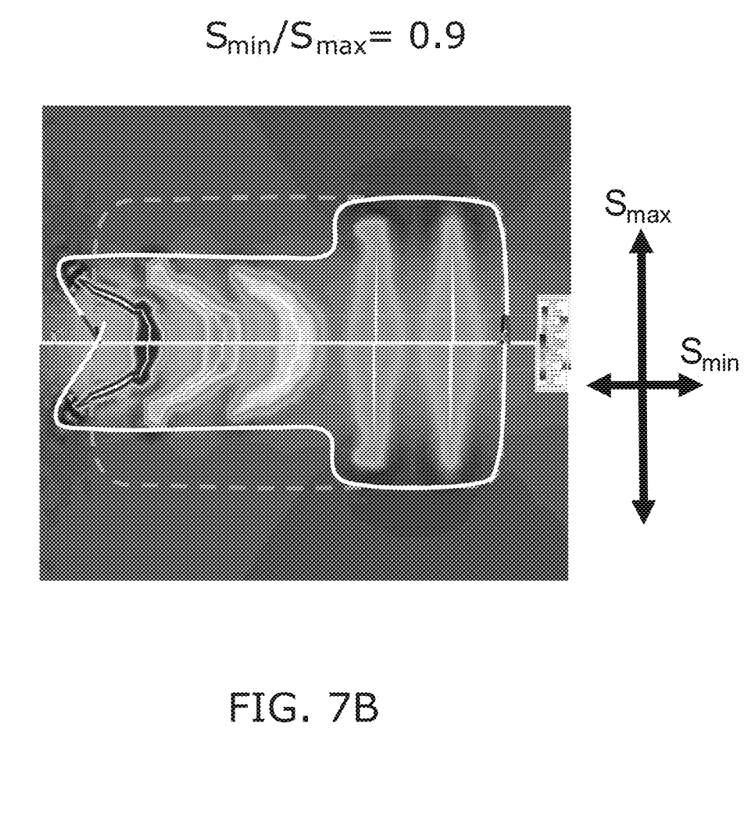

In FIG. 7B, the influence of the first individual volumes (IV) in the stress is higher and, as a result, the new generated individual volumes depart from first order fractures being influenced by the modified stress in the domain ($\Omega$). The influence, as shown in FIG. 7B, is located at the end of the individual volume (IV) for the second individual volume (IV) having a projection of the fractured volume opposite to the location of the first individual volume (IV) even if this second individual volume (IV) is still almost perpendicular to the borehole (B).

The third, fourth and fifth individual volumes (IV) show an inverted "C" shape wherein the ends of the individual volumes (IV) are oriented opposite to the location of the first and second generated individual volumes (IV).

The estimated fractured volume according to the prior art using the same lentil shape is depicted by using a dashed line. A better estimation is obtained by using a method according to the present invention wherein the envelope of the whole set of individual volumes (IV) shows a reduced $S_{max}$ in a portion of the horizontal section of the borehole (B) larger than the half length of said horizontal portion. As a result when the initial $S_{min}/S_{max}$ ratio is 0.9 the prior art overestimates the fractured volume.

The method, according to any of the previous embodiments, may be executed in a computer system, in particular in an electronic device for data analysis, the device comprising:
a processor; and
a computer readable medium storing computer-executable instructions which, when executed by the processor, result in the method of any one of the embodiments.

The invention claimed is:

1. A method for estimating a fractured volume in a reservoir domain that includes a borehole with at least one injection point, the fractured volume generated by injecting a fluid into the reservoir domain through the at least one injection point at a pressure that generates induced fractures, the method comprising:
 a) generating, via a computer system, a geomechanical model of the reservoir domain employing information from the reservoir domain;
 b) generating, via the computer system, a fluid flow model for a fluid stored in the reservoir domain and for the injection fluid;
 c) generating, via the computer system, a first numerical mesh discretizing the geomechanical model, the discretization allowing to represent the induced fractures in the reservoir domain;
 d) generating, via the computer system, a second numerical mesh discretizing the fluid model;
 e) populating, via the computer system, the first numerical mesh with mechanical properties and the second numerical mesh with fluid properties;
 f) estimating an initial stress in the geomechanical model and defining initial conditions for the geomechanical model with the initial stress, and initial conditions for the fluid flow model, via the computer system;
 g) simulating, via the computer system, for a predetermined period of time the geomechanical model and the fluid flow model, both models being coupled wherein boundary conditions take into account injection conditions through the at least one injection point;
 h) determining, via the computer system, numerical mesh regions where a stimulated fracture exists;
 i) computing, via the computer system, the fractured volume measuring the volume of the numerical mesh regions where the stimulated fracture exists.

2. The method according to claim 1, wherein the geomechanical model and the fluid model comprise preexisting fractures statistically distributed according to reservoir information.

3. The method according to claim 1, wherein steps f) to i) are iteratively executed a predetermined number of iterations for automatically determining, via the computer system, fractures departing from previously determined stimulated fractures, and preexisting fractures if they exist, while taking into account a stress field in the reservoir domain modified by the previously determined fractures and the preexisting fractures.

4. The method according claim 1, wherein the first numerical mesh is a finite element method discretization.

5. The method according to claim 4, wherein the finite element method comprises zero-thickness elements for representing the fractures.

6. The method according to claim 1, wherein the second numerical mesh is a finite volume discretization.

7. The method according to claim 1, wherein the borehole comprises a plurality of sections, each section with one or more injection points configured for the generation of the fractures in the reservoir domain by injecting the fluid, wherein the boundary conditions of the simulation states that the injection points injects the fluid sequentially along the sections of the borehole.

8. The method according to claim 1, wherein stimulated reservoir volume is computed by:
   during the simulation of step g), for a predetermined period of time the boundary conditions of the simulation states that the reservoir domain is drained though the injection points; and wherein the method further comprises,
   automatically computing, via the computer system, an envelope of each fracture as a draining front surrounding the fracture; and,
   automatically computing, via the computer system, the stimulated reservoir volume as the volume of the numerical mesh regions where the stimulated facture exist and the adjacent numerical mesh regions bounded by the envelope.

9. The method according to claim 8, wherein the drainage defining the boundary conditions is carried out in a sequential manner along the sections of the borehole using the inverse order of the sequence followed during the injection.

10. The method according to claim 1, wherein during the simulation, the fluid injection through the injection points also provides injecting proppant for keeping the fractures open.

11. The method according to claim 1, wherein simulation of the drainage comprises re-meshing and, the computation of the volumes, the computation of the extended volumes or both, are carried out over a deformed mesh.

12. The method according to claim 1, wherein a portion of the borehole is horizontal and the plurality of sections are located in the horizontal portion.

13. A computer readable medium storing computer-executable instructions which, when executed by a processor, result in the method of claim 1.

14. An electronic device for data analysis, the device comprising:
   a processor; and
   a computer readable medium storing computer-executable instructions which, when executed by the processor, result in the method of claim 1.

* * * * *